United States Patent [19]

Ogawa

[11] 4,132,588

[45] Jan. 2, 1979

[54] CONCENTRATION PROCESS BY MULTISTAGE, MULTIPLE EFFECT EVAPORATOR

[75] Inventor: Shinsaku Ogawa, Nobeoka, Japan

[73] Assignee: Asahi Kasei Kogyo Kabushiki Kaisha, Osaka, Japan

[21] Appl. No.: 764,471

[22] Filed: Jan. 31, 1977

[30] Foreign Application Priority Data

Feb. 6, 1976 [JP] Japan .................................. 51-11231

[51] Int. Cl.² .............................................. B01D 1/26
[52] U.S. Cl. .............................. 159/47 R; 159/20 R; 159/17 R
[58] Field of Search ................... 159/17, 47; 202/173, 202/174

[56] References Cited

U.S. PATENT DOCUMENTS

| 3,428,107 | 2/1969 | Backteman | 202/174 |
| 3,807,479 | 4/1974 | Brannland et al. | 159/17 R |

Primary Examiner—Norman Yudkoff
Attorney, Agent, or Firm—Cooper, Dunham, Clark, Griffin & Moran

[57] ABSTRACT

A method and apparatus in which the effects in multiple effect evaporation systems are separated into successive stages and the vapors in the stages of one effect are utilized as a heat source for the liquid in stages of a subsequent effect.

9 Claims, 3 Drawing Figures

CONCENTRATION PROCESS BY MULTISTAGE, MULTIPLE EFFECT EVAPORATOR

BACKGROUND OF THE INVENTION

This invention relates to an improved concentration process utilizing multistage, multiple effect evaporation systems.

Multistage evaporators are well known. As presently utilized, they require the circulation of large amounts of the liquid to be concentrated, and only the sensible heat of this liquid is converted to latent heat for evaporation. The separate stages are not provided with heating means, and it is not possible to create large differences in concentration of the circulating liquid as it passes from one stage to the next. Accordingly, the procedure is deficient in heat utilization and production efficiency.

Multiple effect evaporators are also well known. In these systems, the heat of the vapor generated in the one effect is utilized to evaporate liquid in a subsequent effect. The system is more efficient than the multistage system. However, conventionally, the effects have been linked in series with the result that the efficiencies of the systems are not satisfactory.

Other systems are known for the concentration of liquids by evaporation.

Many such systems are employed in large scale commercial production. They are, however, expensive and inefficient to operate since all require the generation and dissipation of heat energy. The art, therefore, is continuously engaged in efforts to improve the utilization of heat energy in liquid evaporation systems.

THE INVENTION

The present invention provides a concentration process utilizing combined multistage, multiple effect evaporators which comprises utilizing vapors from plurality of the first stages in a multiple effect component of the system to heat all of the stages in a subsequent effect of the system, the vapors selected for heating a higher temperature liquid in one stage having higher vapor pressure than those selected for heating a lower temperature liquid in another stage.

The invention will be better understood by reference to the accompanying drawings, in which.

The principle of the invention can be best explained by reference to FIG. 1. The same principle is utilized in systems having a plurality of stages and effects.

Figure 1:
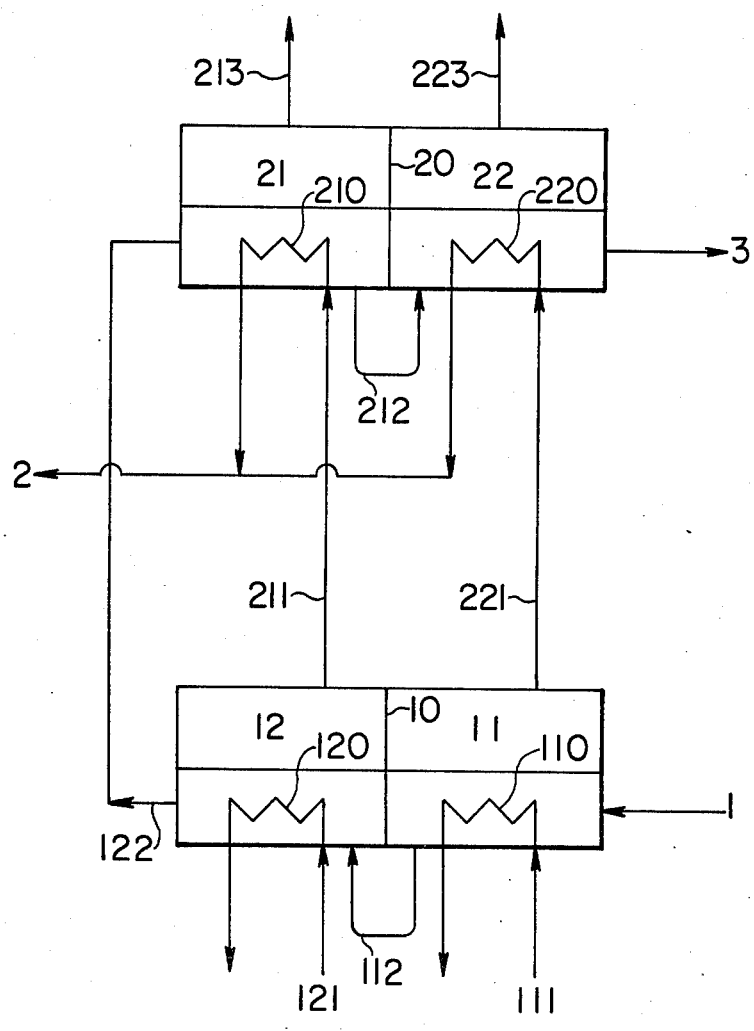
FIG. 1 illustrates a two stage, two (or double) effect evaporator system utilizing the concept of the invention.

According to FIG. 1, the group of first effect evaporators comprises two stage evaporators 11 and 12. The group of second effect evaporators comprises two stage evaporators 21 and 22. The stages are separated one from the other by partition walls 10 and 20. Each stage is provided with its own heater 110, 120, 210 and 220 for heating the liquid to be concentrated. Heat source lines 111 and 121 may be conduits for vapor or for high temperature liquids. Desirably, the temperature of heat source 111 is at least as high as that of heat source 121.

The solution to be concentrated is fed into and through the system via conduits 1, 112, 122 and 212 which, as will be noted, bypass partition walls 10 and 20. The vapor generated in stage 11 is utilized to heat the liquid in stage 22 via heat line 221 to heater 220. The vapor generated in stage 12 is utilized as the heat source to heat the liquid in stage 21 via heat line 211 to heater 210. There is, therefore, a double effect. The condensate formed by condensation of vapor in heat lines 210 and 220 exits the system through line 2. The concentrated liquid formed by evaporation in stages 11, 12, 21 and 22 exits the system through discharge conduit 3. The vapors generated in stages 21 and 22 exit the system through conduits 213 and 223, respectively. These vapors, obviously, could serve as a heat source for a third effect.

It will be seen from FIG. 1 that the first effect evaporator is divided into two stages 11 and 12. The concentration of solute in the solution to be concentrated is lower in 11 than in 12. Therefore, the boiling point rise in 11 is less than that in 12. Therefore, the vapor pressure of vapor generated from 11 is higher than the vapor pressure generated from 12. The vapor from 11, being higher than from 12, can therefore heat the liquid in stage 22 of the second effect more effectively than this same liquid can be heated by the vapor from stage 12.

The invention will be better understood by comparison with the conventional double effect evaporator. In such an evaporator, the concentration of solute in the first effect evaporator is equivalent to the concentration in 12, and the concentration of solute in the second effect evaporator is equal to that in 22, provided that the concentrations of solute are the same as in conduits 1 and 3 of FIG. 1. Therefore, the vapor pressure of the first effect evaporator is equal to that in 211, provided that the temperature of the heating sources are the same. The temperature of the liquid to be concentrated in the second effect in the conventional system would be equal to that of the solution in 22, provided that the temperatures of the cooling sources are the same. Therefore, in the conventional double effect evaporator, the vapor corresponding to 211 must heat the liquid in 22. Clearly, this is less efficient than the present invention where the solution in 22 is heated by the higher pressure vapor from 11.

The following relationships come into being, in accordance with this invention, due to the division of the first effect into stages 11 and 12 divided by wall 10.

a. The concentration of solute in the solution in 11 is lower than in 12, and therefore the vapor pressure in 221 is higher than in 211, provided the heating sources are the same.

b. The concentration of solute in the solution in stage 21 is lower than that in stage 22.

c. The temperature of the solution in 21 is lower than in 22.

It will be apparent, therefore, that by utilizing the multistage, multiple effect system of the present invention it is possible to take longer effective temperature differences at the heaters 220 and 210. In other words, the same effect can be achieved with less heat transmission area. Alternatively, utilizing the same heating and cooling sources as conventional systems, it is possible by the process of the present invention to produce a more concentrated liquid at exit conduit 3.

From FIG. 1, it will be seen that the liquid to be concentrated flows through a series of successive stages in each effect, but the vapors do not. This is in contrast to conventional systems where both liquid and vapor flow through successive stages. Conventional multistage flash evaporator systems do not have heaters corresponding to 110, 120, 210 and 220 of the systems of this invention.

The principle of this invention as described above applies to evaporator systems having more stages and more effects. As the number of stages in each effect is increased, the degree of concentration in each successive stage decreases. The vapor pressure from the solution in the first stage of the first effect is highest since the solution in this stage is least concentrated. Conversely, the concentration in the last stage is highest. As a result, the temperature difference between the temperature of the liquid in the first stage of the first effect and the last stage of the second effect can be made larger. Consequently, it is possible to decrease the heat transmission area of the whole system, or to produce a more concentrated solution.

It will be seen by those skilled in the art that the efficiency of the system can be improved by adding a third effect with a multiple series of stages. A particular advantage of the systems of this invention is that high temperature liquid can be used as a heat source without the attendant disadvantage of large temperature drops usually associated with this type of heat source. This is because the separate effects are divided into a series of stages.

The invention can be practiced in combination with other conventional evaporators such as multistage flash evaporators, multiple effect evaporators, single evaporators, self vapor compression evaporators and the like.

Heaters 110, 120, 210 and 220 may employ any heating system such as natural or forced circulation or falling film.

While suitable for any type of concentration problem, the process of this invention is especially useful for dealing with high boiling liquids because the temperature differences between stages can be greatly increased. The systems of the invention can be usefully employed to concentrate aqueous soda, caustic potash, sugar solutions, and the like.

The vapors from the last effect (213 and 223, for example) can be cooled by any conventional means such as cooling water, barometric condenser, surface condenser, and the like. The vapors may be cooled either in series or in parallel.

The following non-limiting examples are given by way of illustration only.

EXAMPLE 1

Figure 2:
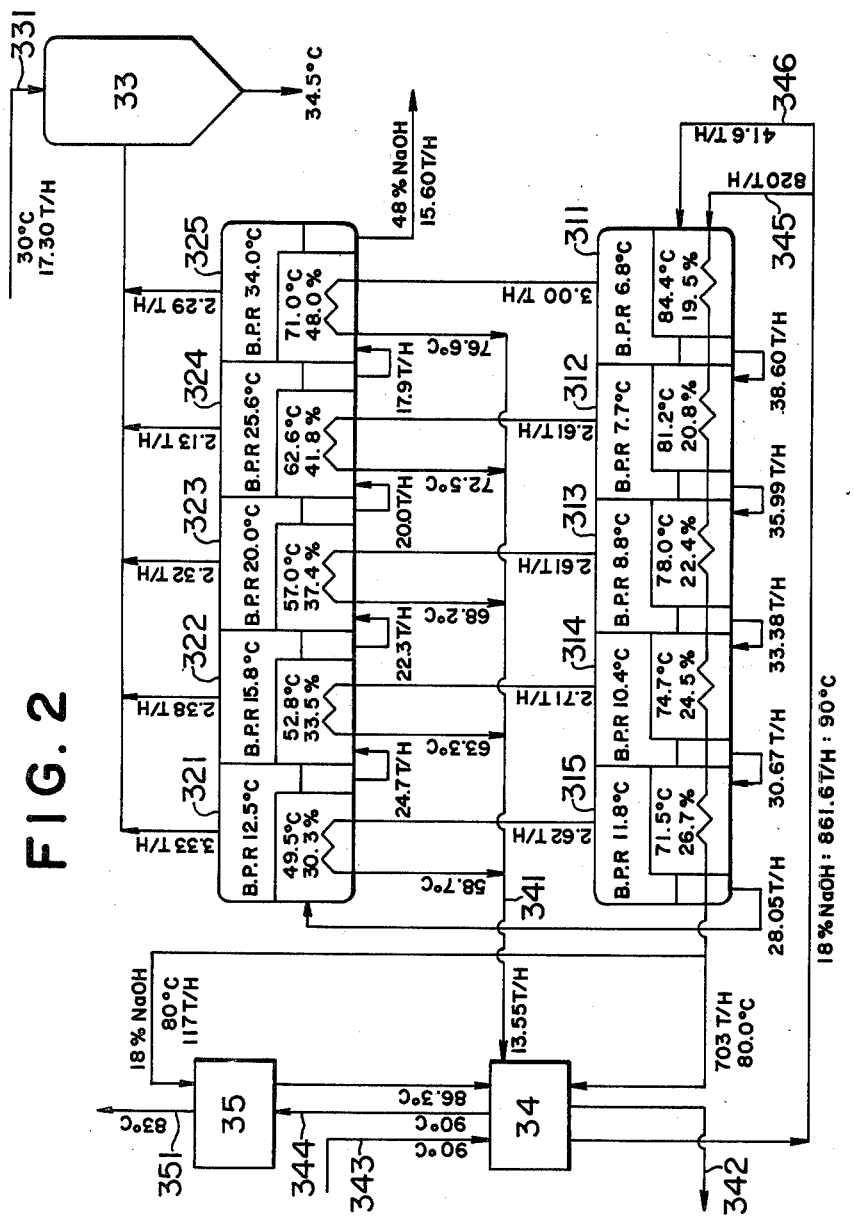
FIG. 2 illustrates another embodiment of the invention utilizing a five stage, double effect evaporator system. The figure illustrates mass balance and temperature distribution achieved in the preparation of a concentrated aqueous sodium hydroxide solution.

This example may be better understood by reference to FIG. 2 which illustrates the concentration of an 18% aqueous sodium hydroxide solution produced in an electrolytic cell to produce a solution with a 48% concentration in a double effect evaporation system in which each effect is divided into five stages. The figure shows the mass balance and temperature distribution.

In the figure, the symbol T/H is tons per hour, and B.P.R. is boiling point rise. The other symbols are conventional. Referring to the first stage 311 in the first effect, 820 tons per hour of 18% aqueous caustic soda flow through as a heat source and 41.6 tons per hour flow through to be concentrated. The temperature in the stage is 84.4° C. and the boiling point rise is 6.8° C.

A total of 38.60 tons per hour of 19.5% aqueous caustic exit the stage 311 to stage 312. A total of 3.00 tons per hour of vapor from stage 311 is used to heat the concentrated aqueous caustic in the last stage 325 of the second effect.

The actual process of the solution to be concentrated as it goes through the various stages in each effect can be readily followed by reference to the figure. It will be seen that the solution which exits the final stage 325 is a 48% aqueous sodium hydroxide solution. It will be seen that the temperature of the solution to be concentrated and the vapor produced decreases through successive stages in the first effect and increases through successive stages in the second effect. The system is designed so that the vapor from the first stage of the first effect is utilized to heat the solution in the last stage of the second effect, thus effecting maximum efficiency.

In FIG. 2, 311 to 315 are the separate stages in the first effect and 321 to 325 are the separate stages in the second effect. The vapor from stages 321 to 325 is combined and condensed in barometric condenser 33. Cooling water flows through conduit 331 and condensed water through conduit 341. The following numbers identify other components in the system:

34 is catholyte tank.
342 is aqueous caustic soda solution to be recirculated to the cathode chamber of the electrolytic cell.
343 is 18% aqueous caustic soda solution returned from electrolytic cell.
344 is hydrogen gas separated from catholyte tank.
345 is 18% aqueous caustic soda used as heat source.
346 is 18% aqueous caustic soda to be concentrated.
35 is a porous plate tower where hydrogen gas is absorbed and cooled.

It will be observed that if a conventional double effect evaporator system were utilized with the same 18% caustic solution, the temperature in the first effect evaporator would be that of the last stage in the first effect, and the saturation temperature of the vapor generated is also the same, that is as low as 58.7° C. Under these conditions, it is clearly impossible to produce 48% caustic soda.

EXAMPLE 2

Figure 3:
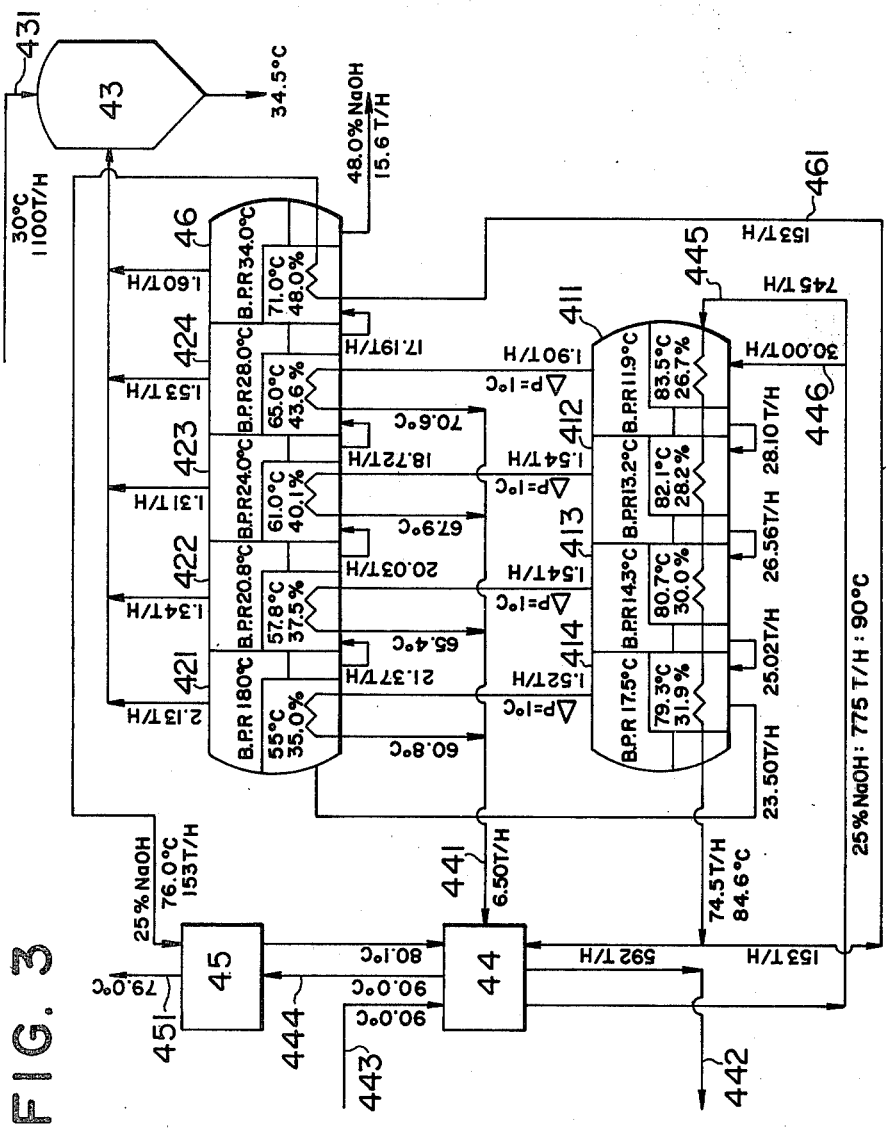
FIG. 3 is similar to FIG. 2 and illustrates a four stage, double effect evaporator system combined with a single evaporator.

This example may be best followed by reference to FIG. 3 which shows the utilization of a double effect system in which there are four stages in each effect to concentrate aqueous sodium hydroxide from 48 wt.% to 25 wt.%. The system is combined with a single evaporator 46. The figure shows the mass balance and temperature distribution.

In the figure:
411 to 414 are the stages in the first effect.
421 to 424 are the stages in the second effect.
43 is a barometric condenser.
431 is cooling water.
44 is a catholyte tank.
441 is condensed water from the second effect.
442 is aqueous caustic soda solution circulated to the cathode chamber of the electrolytic cell.
443 is aqueous caustic soda solution returned from the electrolytic cell.
444 is hydrogen gas from the catholyte tank.
445 is aqueous caustic soda solution used as a heat source.
446 is aqueous caustic soda solution to be concentrated.

45 is a porous plate tower for cooling and absorbing hydrogen.

46 is a single evaporator.

461 is aqueous caustic soda solution used as a heat source for the single evaporator.

It will be seen that the particular improvement of this invention is the division of each effect in a multiple effect evaporation system into a number of stages, and the utilization of the heat values in the vapor from the stage having the highest vapor pressure in one effect to heat the liquid in a stage in the next subsequent effect. The most efficient utilization of the apparatus of the invention is one in which the vapor in the first stage in one effect is utilized to heat the liquid in the last stage in the next succeeding effect.

It is, of course, also possible to combine the vapor from adjacent stages in one effect to heat one stage in a subsequent effect. For example, and with reference to FIG. 2, stage 325 could be omitted from the second effect and the vapors from stages 311 and 312 combined to heat stage 324. This procedure is not as effective as the procedure actually illustrated in FIG. 2. It could be improved, however, by combination with another type of evaporator as illustrated in FIG. 3.

What is claimed is:

1. In a multiple effect evaporation system for the concentration of liquids containing a solute in a solution wherein the vapor from each effect is used to heat the liquid in the next subsequent effect, the improvement which comprises dividing each effect into a number of successive stages through which the liquid flows in the direction of increasing concentration, each stage being provided with heating means, and utilizing the vapors selected from the stages in one effect as said heating means to heat the liquid in each stage in the next subsequent effect; said vapors being selected so that the vapors from the stages in one effect are utilized in order of decreasing concentration of solute in the solution to heat the liquids in the next subsequent effect in order of increasing concentration of solute in solution.

2. A process as in claim 1 wherein the vapor from the first stage in one effect is utilized to heat the liquid in the last stage in the subsequent effect.

3. A process as in claim 1 wherein the vapor from the stage having the highest vapor pressure is combined with the vapor from the next adjacent stage and the combined vapors are utilized to heat the liquid in the last stage in a subsequent effect.

4. A process as in claim 1 wherein the number of stages in each effect is the same.

5. A process as in claim 1 wherein the number of effects is two.

6. A process as in claim 1 wherein the liquid to be concentrated in the first effect is heated with the sensible heat of a liquid flowing in series through heaters in successive stages.

7. A process as in claim 1 wherein the liquid to be concentrated is aqueous caustic soda solution.

8. A process as in claim 7 wherein the caustic soda solution is the product of the electrolysis of aqueous sodium chloride in an electrolytic cell.

9. A process as in claim 8 wherein the caustic soda solution is divided in two streams, one used as the source of sensible heat in the first effect, and the other as the liquid to be concentrated.

* * * * *